United States Patent
Aoki

(10) Patent No.: US 6,466,543 B1
(45) Date of Patent: Oct. 15, 2002

(54) PACKET DATA SENDING APPARATUS

(75) Inventor: Takahiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/219,264

(22) Filed: Dec. 23, 1998

(30) Foreign Application Priority Data

Jun. 10, 1998 (JP) .......................................... 10-162310

(51) Int. Cl.$^7$ .............................................. H04L 12/56
(52) U.S. Cl. ...................... 370/230; 370/235; 370/437; 370/468
(58) Field of Search ........................ 370/229, 230–235, 370/420, 431, 437, 463, 252, 468

(56) References Cited

U.S. PATENT DOCUMENTS

| | | | |
|---|---|---|---|
| 5,889,763 A | * 3/1999 | Boland et al. | 370/235 |
| 5,905,730 A | * 5/1999 | Yang et al. | 370/429 |
| 5,987,031 A | * 11/1999 | Miller et al. | 370/412 |
| 6,094,692 A | * 7/2000 | Kalkunte | 710/34 |
| 6,108,305 A | * 8/2000 | Charny et al. | 370/232 |
| 6,208,652 B1 | * 3/2001 | Stephens et al. | 370/395 |

FOREIGN PATENT DOCUMENTS

| | | |
|---|---|---|
| JP | 2-170645 | 7/1990 |
| JP | 4-113744 | 4/1992 |

* cited by examiner

*Primary Examiner*—Ricky Ngo
*Assistant Examiner*—Tri H. Phan
(74) *Attorney, Agent, or Firm*—Katten Muchin Zavis Rosenman

(57) ABSTRACT

A packet data sending apparatus controls a data transmission rate accurately at a constant level. The packet data sending apparatus has a sent data amount storage unit, a calculating unit, a selecting unit, and a packet sending unit. The sent data amount storage unit stores an amount of packet data sent from a preset time to a preceding packet sending timing. The calculating unit adds a plurality of amounts of packet data which may possibly be sent at a present packet sending timing, to the stored amount of packet data thereby to obtain a plurality of total amounts of packet data, and divides the total amounts of packet data by a time period from the preset time to the present packet sending timing thereby to calculate a plurality of data transmission rates. The selecting unit selects a data transmission rate closest to a desired data transmission rate from the calculated data transmission rates. The packet sending unit sends a number of packets corresponding to the amount of packet data commensurate with the selected data transmission rate.

13 Claims, 6 Drawing Sheets

PACKET DATA SENDING APPARATUS

BACKGROUND OF THE INVENTION

(1) Field of the Invention

The present invention relates to a packet data sending apparatus, and more particularly to a packet data sending apparatus capable of sending a plurality of packets at each packet sending timing and a packet data sending apparatus capable of sending packet data at any of a plurality of existing data transmission rates.

(2) Description of the Related Art

With the widespread popularity of the Internet in recent years, there has been a growing concern about services to transmit audio and video data through networks. In order to perform such services, it is necessary to transmit packets at a constant data transmission rate. ATM (Asynchronous Transfer Mode) networks incorporate a hardware arrangement for ensuring a constant data transmission rate. However, any arrangement for attaining a constant data transmission rate is not incorporated in LANs (Local Area Networks), typically the Ethernet that is currently in most widespread use.

The principles of the present invention serve to realize the transmission of packets at a constant data transmission rate in a network which does not incorporate such an arrangement for attaining a constant data transmission rate.

Heretofore, the simplest process of attaining a constant data transmission rate is to send packets, each containing a constant amount of data, at constant time intervals. For example, if a desired data transmission rate is 1 Mbps and one packet contains 1 Kb of data, then 1,000 packets are transmitted per second, i.e., one packet is transmitted per millisecond.

For transmitting packets at a data transmission rate of 1 Mbps under software control, it is programmed to start a task for transmitting a packet at an interval of 1 ms, and one packet containing 1 Kb of data is transmitted each time the task is started. In this manner, the desired data transmission rate is attained. The desired data transmission rate can also be attained in a similar manner for transmitting packets based on a hardware arrangement.

However, the conventional processes cannot expect data transmission rates to be accurate. Specifically, the multitasking principles for simultaneously executing a plurality of tasks with a single CPU are applied to ordinary small-size computers. In the multitasking operation, different tasks are successively processed in divided unit times. Since a next task is started after a preceding task is finished, the time to start the next task depends on the time to finish the preceding task, and may not necessarily be synchronous with the control timing. The range of interrupts whose execution should be given priority is narrowed. Therefore, even if tasks for transmitting packets are set so as to be started at respective constant time intervals, the tasks are actually started at time intervals different from the constant time intervals, and hence no accurate data transmission rate can be expected. For example, if the actual time intervals at which the packet data transmission tasks are started deviate from the constant time intervals by 1%, then the attained data transmission rate also deviates from the desired data transmission rate by 1%.

Thus, an inaccuracy of the time intervals at which the packet data transmission tasks are started directly results in an inaccuracy of the data transmission rate. Usually, reception sides have a buffer for absorbing a variation of the data transmission rate that occurs in a short period of time such as few minutes. However, the buffer cannot absorbing data transmission rate variations if the data is video data which is transmitted over a long period of time.

Time intervals at which tasks are started are determined by a certain minimum unit period, and can only be changed to integral multiples of the minimum unit period. Consequently, the data transmission rate can only take discrete values, and hence cannot be adjusted by smaller values. This also holds true for the hardware-implemented control of data transmission rates.

SUMMARY OF THE INVENTION

It is an object of the present invention to provide a packet data sending apparatus which is capable of accurately controlling a data transmission rate at a constant value and continuously changing a data transmission rate.

To achieve the above object, there is provided a packet data sending apparatus for sending a plurality of packets at each packet sending timing. The packet data sending apparatus has sent data amount storage means for storing an amount of packet data sent from a preset time to a preceding packet sending timing, calculating means for adding a plurality of amounts of packet data which may possibly be sent at a present packet sending timing, to the amount of packet data stored in the sent data amount storage means thereby to obtain a plurality of total amounts of packet data, and dividing the total amounts of packet data by a time period from the preset time to the present packet sending timing thereby to calculate a plurality of data transmission rates, selecting means for selecting a data transmission rate closest to a desired data transmission rate from the data transmission rates calculated by the calculating means, and packet sending means for sending a number of packets corresponding to the amount of packet data commensurate with the data transmission rate selected by the selecting means.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of a packet data sending apparatus according to a first embodiment of the present invention will be described below with reference to FIG. 1.

Figure 1:
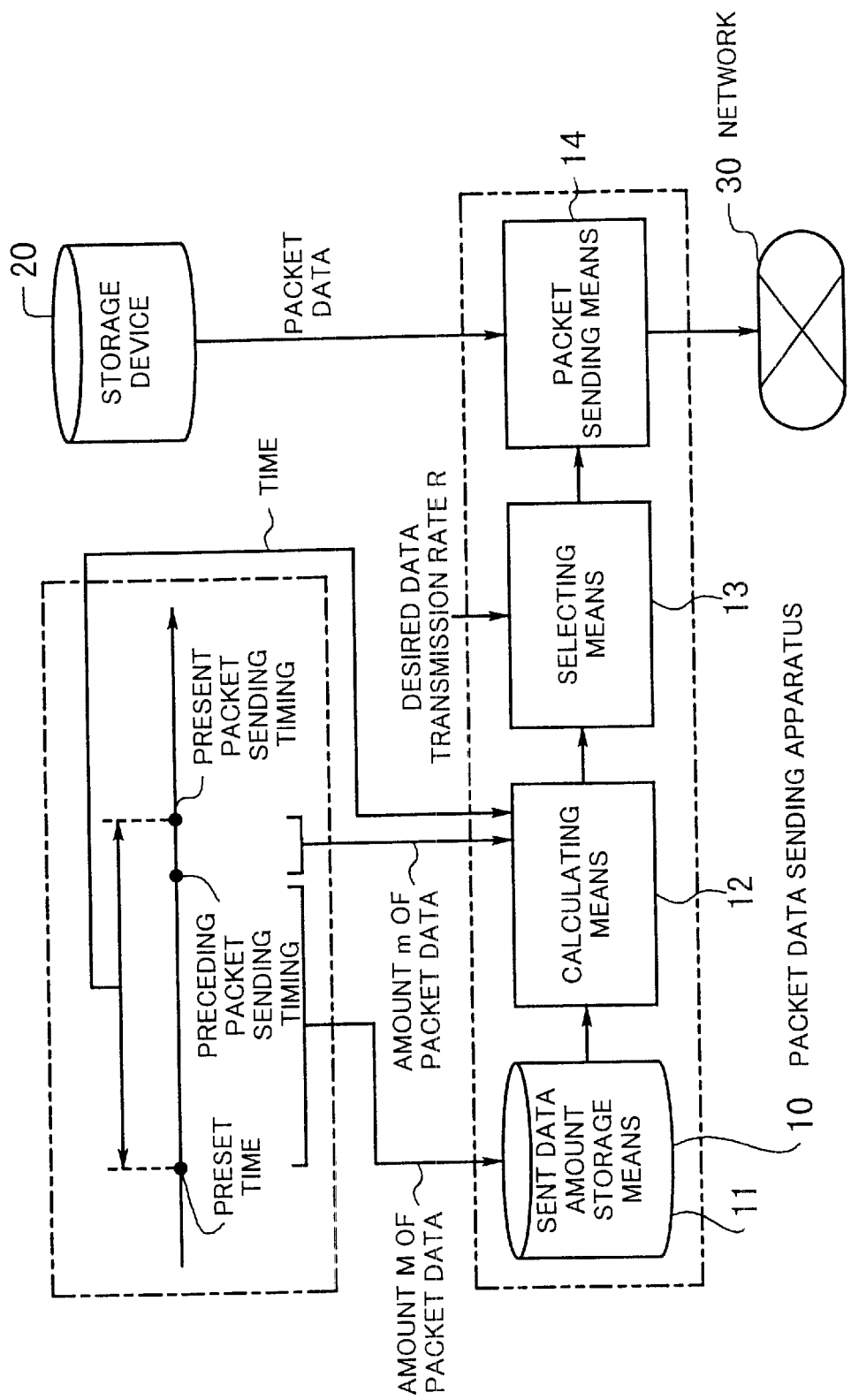
FIG. 1 is a block diagram illustrating the principles of a packet data sending apparatus according to a first embodiment of the present invention.

As shown in FIG. 1, the packet data sending apparatus, generally denoted by 10, comprises a sent data amount storage means 11 for storing an amount of packet data sent from a preset time to a preceding packet sending timing, a calculating means 12 for adding a plurality of amounts of packet data which may possibly be sent at a present packet sending timing, to the amount of packet data stored in the sent data amount storage means 11 thereby to obtain a plurality of total amounts of packet data, and dividing the total amounts of packet data by a time period from the preset time to the present packet sending timing thereby to calculate a plurality of data transmission rates, a selecting means 13 for selecting a data transmission rate closest to a desired data transmission rate from the data transmission rates calculated by the calculating means 12, and a packet sending means 14 for sending a number of packets corresponding to the amount of packet data commensurate with the data transmission rate selected by the selecting means 13.

The packet data sending apparatus 10 can send a plurality of packets at each packet sending timing, and the storage device 20 stores packet data to be transmitted from now on.

The sent data amount storage means 11 stores the amount M of packet data of all packets sent from the preset time to the preceding packet sending timing. The preset time may be a time to start transmitting a series of packet data, for example.

If it is possible to send $N_{MAX}$ packets at the present packet sending timing, then the calculating means 12 adds amounts $m_0$–$m_{NMAX}$ of packet data of the packets (0, 1, 2, ..., $N_{MAX}$) which may possibly be sent at the present packet sending timing, to the amount M of packet data stored in the sent data amount storage means 11 thereby to obtain a plurality of total amounts (M+$m_0$)–(M+$m_{MAX}$) of packet data. For example, the amount $m_0$ of packet data is the amount of packet data (=0) when no packet is sent at the present packet sending timing. The amount $m_1$ of packet data is the amount of packet data of one packet when it is sent at the present packet sending timing. The amount $m_2$ of packet data is the amount of packet data of two packets when they are sent at the present packet sending timing. The amount $m_{NMAX}$ of packet data is the amount of packet data of $N_{MAX}$ packets when they are sent at the present packet sending timing.

The calculating means 12 then divides the calculated total amounts (M+$m_0$)–(M+$m_{MAX}$) of packet data by a time period from the preset time to the present packet sending timing thereby to calculate a plurality of data transmission rates $R_0$–$R_{NMAX}$.

The selecting means 13 selects a data transmission rate closest to a desired data transmission rate R from the data transmission rates calculated by the calculating means 12. Based on the amount of packet data commensurate with the data transmission rate selected by the selecting means 13, the packet sending means 14 reads a corresponding amount of packet data from the storage device 20, generates packets of the read amount of packet data, and sends the generated packets to a network 30.

As described above, the calculating means 12 calculates a plurality of data transmission rates $R_0$–$R_{NMAX}$ based on the packet data transmitted after the preset time. The selecting means 13 selects a data transmission rate closest to the desired data transmission rate R from the data transmission rates calculated by the calculating means 12. The packet sending means 14 sends a number of packets depending on the data transmission rate selected by the selecting means 13. Therefore, even if the present packet sending timing deviates, packets can be sent at a data transmission rate closest to the desired data transmission rate R. The data transmission rate can continuously be varied simply by changing the desired data transmission rate R.

The packet data sending apparatus 10 according to the first embodiment of the present invention will be described in detail below.

Figure 2:
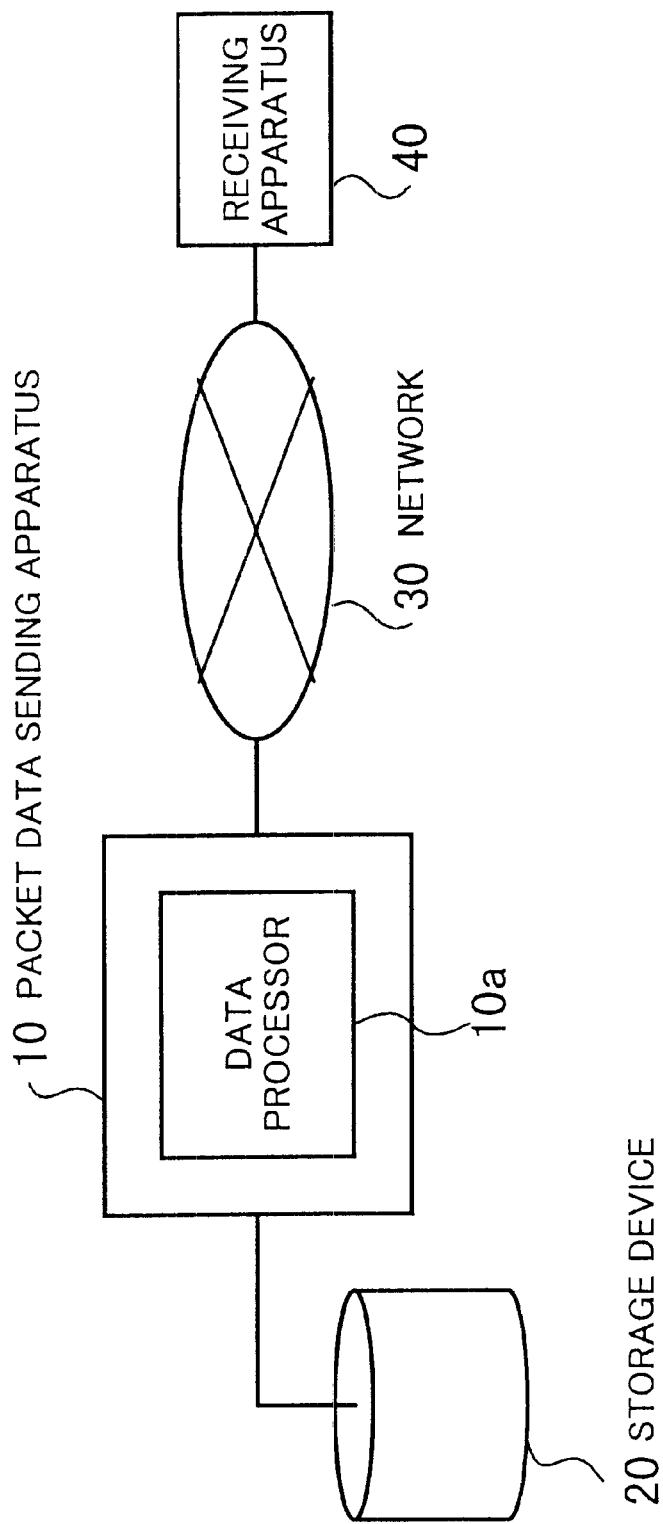
FIG. 2 is a block diagram of a packet transmission and reception system including the packet data sending apparatus according to the first embodiment of the present invention.

FIG. 2 shows in block form a packet transmission and reception system including the packet data sending apparatus 10 according to the first embodiment of the present invention. As shown in FIG. 2, a storage device 20 stores video data and audio data. The packet data sending apparatus 10 reads video data and audio data stored in the storage device 20, generates packets of the read data, and transmits the generated packets via the network 30 to a receiving apparatus 40. The network 30 may be a LAN or a non-ATM network. The receiving apparatus 40 has a buffer capable of absorbing variations of transmission timing of packet data transmitted from the packet data sending apparatus 10.

According to the first embodiment, the packet data sending apparatus 10 transmits such packet data that the amount of data contained in packets is not fixed, i.e., the packet size is not constant, and that need an accurate packet data transmission rate rather than high-speed packet data transmission processing. The preset time used in the calculating means 12 is a time at which packet data start being transmitted.

The packet data sending apparatus 10 comprises a data processor 10a comprising a CPU, a RAM, a ROM, and an I/O. The sent data amount storage means 11, the calculating means 12, the selecting means 13, and the packet sending means 14 are functions performed by the processing operation of the data processor 10a.

Figure 3:
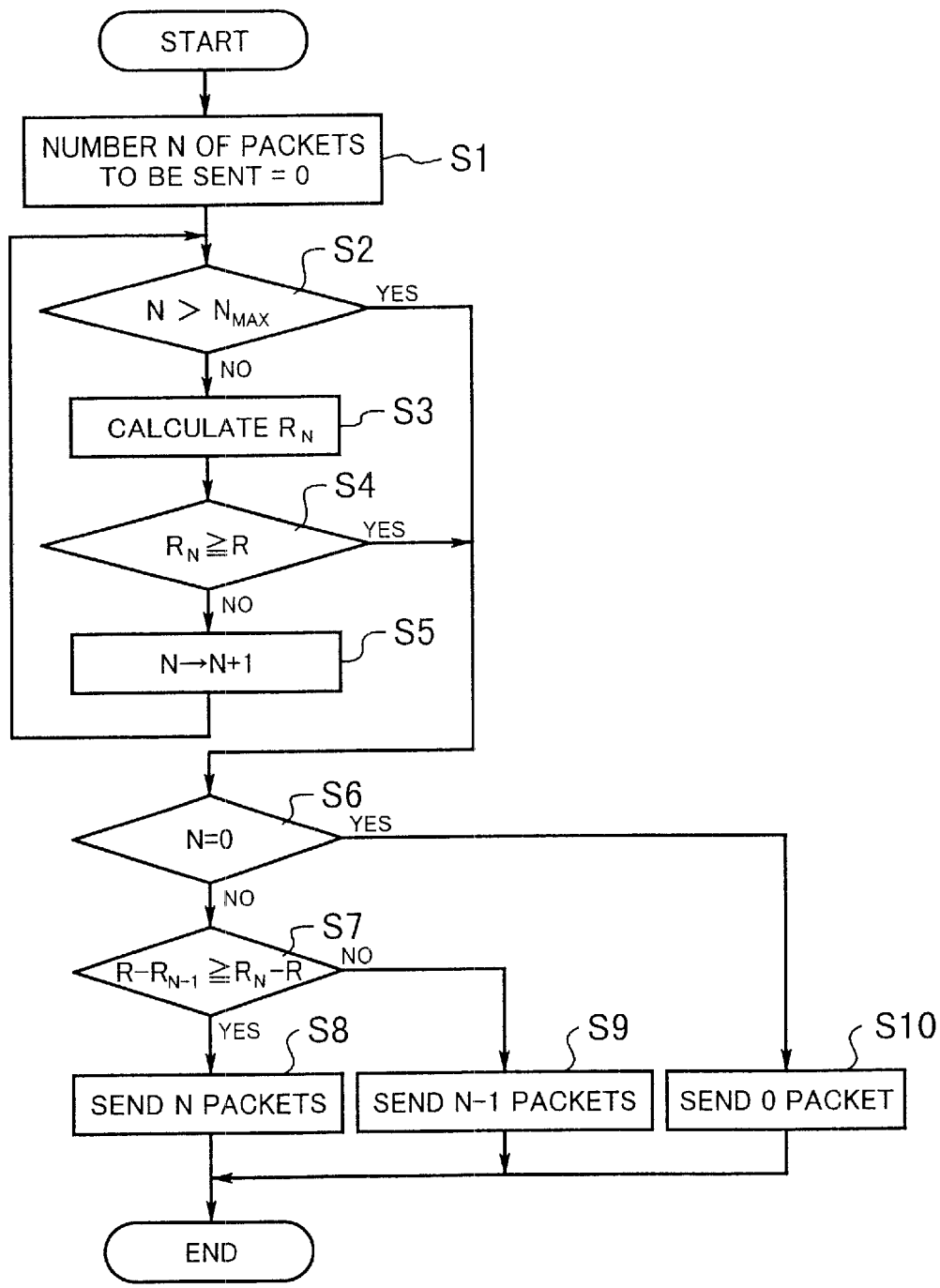
FIG. 3 is a flowchart of a sequence of a packet data sending task executed by the packet data sending apparatus according to the first embodiment of the present invention.

FIG. 3 shows a sequence of a packet data sending task executed by the packet data sending apparatus 10 according to the first embodiment. A packet data sending sequence will be described below with reference to FIG. 3 where numbers with a prefix "S" represent steps.

A start time at which data starts being sent and a total amount of packet data sent up to a preceding packet sending timing are recorded with respect to each item of data being sent. It is assumed that the start time is represented by $T_0$ and the total amount of packet data sent from the start time $T_0$ up to the preceding packet sending timing is represented by M bits.

The packet data sending task shown in FIG. 3 is started at constant time intervals. It is assumed that the packet data sending task is started at a present packet sending timing T.

First, the number N of packets to be sent presently is set to "0" in step S1. Then, the number N of packets is compared with a maximum number $N_{MAX}$ of packets that can be sent in step S2. If the number N of packets is equal to or smaller than the maximum number $N_{MAX}$ of packets, then a data transmission rate $R_N$ is calculated in step S3. The maximum number $N_{MAX}$ of packets that can be sent is a maximum number of packets that can be sent when one packet data sending task is started.

The data transmission rate $R_N$ is calculated according to the following equation (1):

$$R_N = (M + m_N)/(T - T_0) \qquad (1)$$

where $m_N$ represents the total amount of packet data contained in N packets to be sent presently. Since the number N of packets has been set to "0", $m_N = 0$.

Because the period at which to start the packet data sending task is much smaller than the value $(T-T_0)$ of the denominator of the equation (1), the value of the denominator may be set to the difference between the preceding packet sending timing and the start time $T_0$.

The data transmission rate $R_N$ thus calculated is compared with the desired data transmission rate R in step S4. If the data transmission rate $R_N$ is smaller than the desired data transmission rate R, the number N of packets is incremented by 1 in step S5, after which control goes back to step S2.

The number N of packets is incremented by 1 in successive loops until the number N of packets is greater than the maximum number $N_{MAX}$ of packets in step S2 or the data transmission rate $R_N$ is equal to or greater than the desired data transmission rate R in step S4, whereupon control proceeds to step S6.

In step S6, it is decided whether the number N of packets is "0" or not. If the number N of packets is "0", then no packet is sent at the present packet sending timing T in step S10. If the number N of packets is not "0", then the difference $(R - R_{N-1})$ between the desired data transmission rate R and a lower data transmission rate $R_{N-1}$ and the difference $(R_N - R)$ between a higher data transmission rate $R_N$ and the desired data transmission rate R are determined and compared with each other in step S7. If the difference $(R - R_{N-1})$ is equal to or greater than the difference $(R_N - R)$, i.e., if the higher data transmission rate $R_N$ is closer to the desired data transmission rate R than the lower data transmission rate $R_{N-1}$ is, then N packets are sent at the present packet sending timing T in step S8. If the difference $(R_N - R)$ is greater than the difference $(R - R_{N-1})$, i.e., if the lower data transmission rate $R_{N-1}$ is closer to the desired data transmission rate R than the higher data transmission rate $R_N$ is, then (N−1) packets are sent at the present packet sending timing T in step S9.

Stated otherwise, if R $R_0 < \ldots < R_{NMAX}$, then the number N of packets to be sent presently is set to "0" in step S10. If $R_0 < \ldots < R_{N-1} < R < R_N < \ldots < R_{NMAX}$, then a data transmission rate closest to the desired data transmission rate R is either $R_{N-1}$ or $R_N$. If the data transmission rate $R_{N-1}$ is closest to the desired data transmission rate R, then (N−1) packets are sent in step S9. If the data transmission rate $R_N$ is closest to the desired data transmission rate R, then N packets are sent in step S8. If $R_0 < \ldots < R_{NMAX}$ R, then the number N of packets to be set presently is set to $N_{MAX}$ in step S8.

As described above, a plurality of data transmission rates $R_0 - R_{NMAX}$ are calculated on the basis of an accumulated amount M of packet data transmitted after the start time $T_0$, one of the calculated data transmission rates $R_0 - R_{NMAX}$ which is closest to the desired data transmission rate R is selected, and a number of packets commensurate with the selected data transmission rate are sent. The buffer of the receiving apparatus 40 absorbs a deviation of the data transmission rate that occurs in a short period of time, whereas selecting a number of packets according to the present invention is effective to absorb a variation of the data transmission rate that occurs in a long period of time. Therefore, even if tasks for transmitting packet data are started at inaccurate time intervals, the data transmission rate can be controlled accurately.

Consequently, even non-ATM packet data sending apparatus can perform a service of transmitting video data of high image quality over a long period time without suffering a frame data loss.

Furthermore, the data transmission rate can continuously be changed simply by arbitrarily changing the desired data transmission rate R while keeping intact the time intervals to start packet data transmission tasks.

Ordinary data that occur as bursts, rather than video and audio data, can also be transmitted at a constant data transmission rate, but not as burst data. Therefore, when such ordinary data that occur as bursts are transmitted, the burden on the network is reduced, and any transmission loss of the data is also reduced.

A packet data sending apparatus according to a second embodiment of the present invention will be described below.

The packet data sending apparatus according to the second embodiment is basically identical structurally to the packet data sending apparatus according to the first embodiment shown in FIG. 2. Consequently, the packet data sending apparatus shown in FIG. 2 will be referred to in the description of the packet data sending apparatus according to the second embodiment.

According to the second embodiment, the packet data sending apparatus transmits such packet data that the amount of data contained in packets is not fixed, i.e., the packet size is not constant, and that need high-speed packet data transmission processing rather than an accurate packet data transmission rate. The preset time used in the calculating means 12 is a time at which packet data start being transmitted.

The packet data sending apparatus 10 according to the second embodiment performs a processing operation different from that of the packet data sending apparatus 10 according to the first embodiment.

Figure 4:
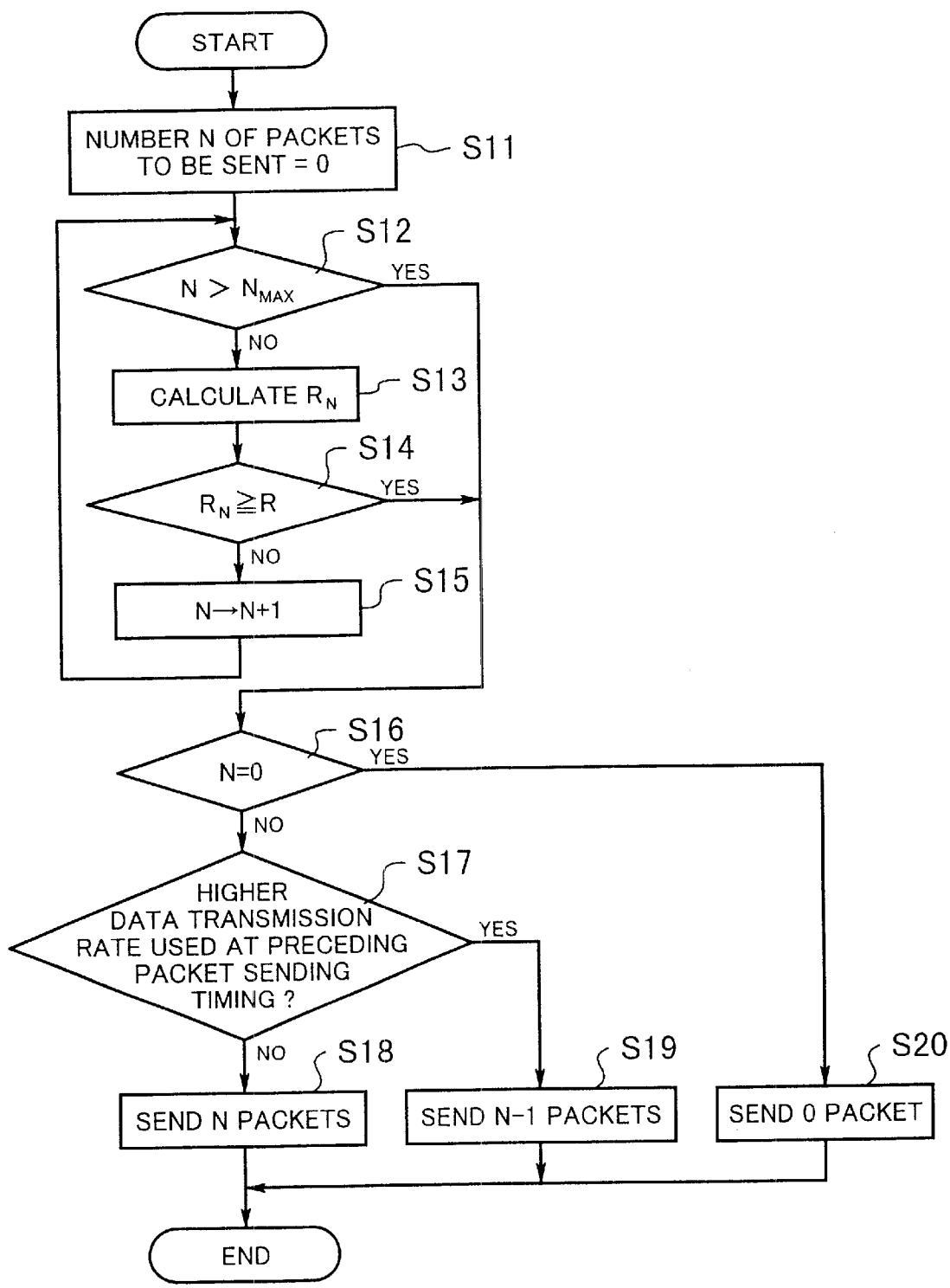
FIG. 4 is a flowchart of a sequence of a packet data sending task executed by a packet data sending apparatus according to a second embodiment of the present invention.

FIG. 4 shows a sequence of a packet data sending task executed by the packet data sending apparatus 10 according to the second embodiment.

The packet data sending task according to the second embodiment shown in FIG. 4 is basically the same as the packet data sending task according to the first embodiment shown in FIG. 3, except for step S7. Specifically, the processing in steps S11–S16, S18–S20 shown in FIG. 4 are identical to steps S1–S6, S8–S10 shown in FIG. 3.

In step S17, it is decided whether a higher data transmission rate or a lower data transmission rate was used when a packet data sending task was executed at the preceding packet sending timing. Specifically, when a packet data sending task was executed at the preceding packet sending timing, it is decided whether a higher data transmission rate greater than the desired data transmission rate R was used, i.e., whether step S18 was executed, or a lower data transmission rate smaller than the desired data transmission rate R was used, i.e., whether step S19 was executed. If a higher data transmission rate was used at the preceding packet sending timing, then a lower data transmission rate is used at the present packet sending timing T, and step S19 is executed to send (N−1) packets. Conversely, if a lower data transmission rate was used at the preceding packet sending timing, then a higher data transmission rate is used at the present packet sending timing T, and step S18 is executed to send N packets.

According to the second embodiment, as described above, upper and lower data transmission rates are alternately used at respective packet sending timings. This can simplify the calculation process for a higher processing speed though the accuracy of the data transmission rate is slightly lowered.

A packet data sending apparatus according to a third embodiment of the present invention will be described below.

The packet data sending apparatus according to the third embodiment is basically identical structurally to the packet data sending apparatus according to the first embodiment shown in FIG. 2. Consequently, the packet data sending apparatus shown in FIG. 2 will be referred to in the description of the packet data sending apparatus according to the third embodiment.

According to the third embodiment, the packet data sending apparatus transmits such packet data that the amount of data contained in packets is constant, i.e., the packet size is constant, and that need an accurate packet data transmission rate rather than high-speed packet data transmission processing. The preset time used in the calculating means 12 is a time at which packet data start being transmitted.

According to the third embodiment, a start time at which data starts being sent and a total number of packets sent up to a preceding packet sending timing are recorded with respect to each item of data being sent. It is assumed that the start time is represented by $T_0$ and the total number of packets sent from the start time $T_0$ up to the preceding packet sending timing is represented by $M_P$.

According to the third embodiment, the data transmission rate $R_N$ is calculated in step S3 shown in FIG. 3 according to an equation which is different from the equation (1) described above according to the first embodiment.

Specifically, the data transmission rate $R_N$ at the present packet sending timing T is calculated according to the following equation (2):

$$R_N = (M_P + N) S_0 / (T - T_0) \quad (2)$$

where $S_0$ represents the number of bits of the amount of data (packet size) contained in one packet and N represents the number of packets to be sent presently.

Based on the fact that the packet size is constant, the total number $M_P$ of packets sent from the start time $T_0$ up to the preceding packet sending timing is saved, and a data transmission rate $R_N$ is calculated using the saved total number $M_P$ of packets. Since video data are sent as packets of the same size, it is not necessary to record a total amount of packet data sent in the past to each user. Rather, the data transmission rate $R_N$ can be calculated according to the equation (2), simply by recording the number of packets sent in the past. The storage area needed can be reduced because the number of packets, rather than the total amount of packet data, is recorded therein.

A packet data sending apparatus according to a fourth embodiment of the present invention will be described below.

The packet data sending apparatus according to the fourth embodiment is a combination of the packet data sending apparatus according to the second and third embodiments. Specifically, the packet data sending apparatus according to the fourth embodiment transmits such packet data that the amount of data contained in packets is constant, i.e., the packet size is constant, and that need high-speed packet data transmission processing rather than an accurate packet data transmission rate. The preset time used in the calculating means 12 is a time at which packet data start being transmitted.

The packet data sending apparatus according to the fourth embodiment is basically identical structurally to the packet data sending apparatus according to the first embodiment shown in FIG. 2. Consequently, the packet data sending apparatus shown in FIG. 2 will be referred to in the description of the packet data sending apparatus according to the fourth embodiment.

According to the fourth embodiment, the total number $M_P$ of packets sent from the start time $T_0$ up to the preceding packet sending timing is saved, and a data transmission rate $R_N$ is calculated using the saved total number $M_P$ of packets according to the equation (2) in the third embodiment.

According to the fourth embodiment, furthermore, the processing corresponding to step S7 shown in FIG. 3 is different from the processing according to the first embodiment. Specifically, it is decided whether a higher data transmission rate or a lower data transmission rate was used when a packet data sending task was executed at the preceding packet sending timing. If a higher data transmission rate was used at the preceding packet sending timing, then (N-1) packets are sent at the present packet sending timing T in step S9. Conversely, if a lower data transmission rate was used at the preceding packet sending timing, then N packets are sent at the present packet sending timing T in step S8.

Therefore, the storage area needed can be reduced because the number of packets, rather than the total amount of packet data, is recorded therein. In addition, the calculation process can be simplified for a higher processing speed though the accuracy of the data transmission rate is slightly lowered.

A packet data sending apparatus according to a fifth embodiment of the present invention will be described below.

In the first through fourth embodiments, the preset time used in the calculating means 12 is a time to start transmitting packet data. According to the fifth embodiment, however, there is established a limitation (overflow level) for the amount of data that can be stored in the sent data amount storage means 11, and the preset time used in the calculating means 12 is defined as a time at which the amount of data stored in the sent data amount storage means 11 has reached a predetermined level smaller than the limitation.

Except for the above features, the packet data sending apparatus according to the fifth embodiment is basically identical structurally to the packet data sending apparatus according to the first embodiment shown in FIG. 2. Consequently, the packet data sending apparatus shown in FIG. 2 will be referred to in the description of the packet data sending apparatus according to the fifth embodiment.

Figure 5:
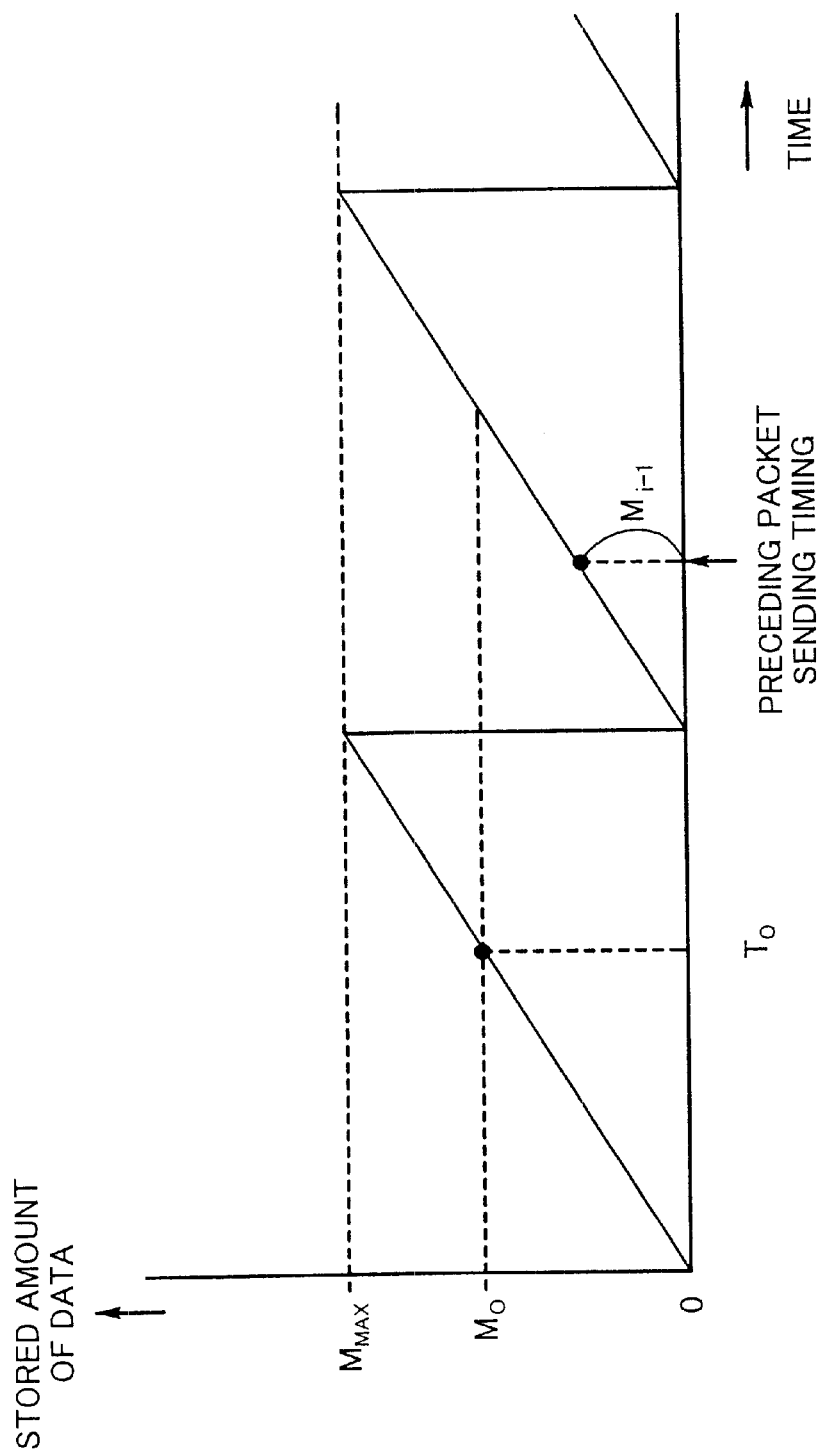
FIG. 5 is a diagram showing how the amount of data stored in a sent data amount storage means varies with time in a packet data sending apparatus according to a fifth embodiment of the present invention.

FIG. 5 shows how the amount of data stored in the sent data amount storage means 11 varies with time in the packet data sending apparatus according to the fifth embodiment of the present invention. As shown in FIG. 5, when the amount of data stored in the sent data amount storage means 11 reaches an overflow level $M_{MAX}$, it returns to a level "0". The predetermined level is a fixed level $M_0$ which is smaller than the overflow level $M_{MAX}$. When the amount of data stored in the sent data amount storage means 11 reaches the predetermined level $M_0$ at a certain time, the packet data sending apparatus 10 stores that time as the preset time $T_0$.

The total amount M of packet data sent from the start time $T_0$ up to the preceding packet sending timing is calculated according to the following equation (3):

$$M = M_{MAX} - M_0 + M_{1-l} \quad (3)$$

where $M_{1-l}$ represents the amount of data stored in the sent data amount storage means 11 at the preceding packet sending timing.

The packet data sending task shown in FIG. 4 is executed using the total amount M of packet data and the preset time $T_0$. However, if the stored amount $M_{1-l}$ of data is of a value between the predetermined level $M_0$ and the overflow level $M_{MAX}$ in calculating the data transmission rate $R_N$ in step S3, then the preset time which has previously been determined, not a newly determined preset time, is used as the preset time $T_0$.

Consequently, even when the amount of data stored in the sent data amount storage means 11 becomes a value close to "0" due to an overflow, the denominator of the equation (1) does not become a value close to "0", and hence the data transmission rate $R_N$ calculated according to the equation (1) is of a highly accurate value. Stated otherwise, if the value of the denominator is large, any error contained in the time does not greatly affect the value of the denominator. Accordingly, an error in the data transmission rate $R_N$ due to an error in the time is not significantly large.

If the predetermined level $M_0$ is set to a value close to the overflow level $M_{MAX}$, then the accuracy of the data transmission rate $R_N$ falls. Therefore, the predetermined level $M_0$ should be set to a value close to half of $M_{MAX}$.

In the above description, the process of setting the time when the amount of data stored in the sent data amount storage means 11 as the preset time $T_0$ is applied to the first embodiment. However, the same process may be applied to the second through fourth embodiments. If the process is applied to the third and fourth embodiments, then each of the values M, $M_{MAX}$, $M_0$, and $M_{1-l}$ represents the number of packets.

A packet data sending apparatus according to a sixth embodiment of the present invention will be described below.

The packet data sending apparatus according to a sixth embodiment comprises a plurality of parallel packet data sending apparatus according respectively to the first through fourth embodiments, and a sending process selector connected to input terminals of the parallel packet data sending apparatus. The sending process selector determines the nature of input data, selects one of the parallel packet data sending apparatus according respectively to the first through fourth embodiments depending on the determined nature of input data, and sends the input data to the selected packet data sending apparatus.

There are two natures of input data to be determined by the sending process selector. One of the natures of input data indicates whether the amount of data contained in packets is constant or not, and the other nature indicates which of an accurate packet data transmission rate or high-speed packet data transmission processing should be given priority.

If input data is such packet data that the amount of data contained in packets is not constant and that requires an accurate packet data transmission rate in preference to high-speed packet data transmission processing, then the sending process selector sends the input data to the packet data sending apparatus according to the first embodiment.

If input data is such packet data that the amount of data contained in packets is not constant and that requires high-speed packet data transmission processing in preference to an accurate packet data transmission rate, then the sending process selector sends the input data to the packet data sending apparatus according to the second embodiment.

If input data is such packet data that the amount of data contained in packets is constant and that requires an accurate packet data transmission rate in preference to high-speed packet data transmission processing, then the sending process selector sends the input data to the packet data sending apparatus according to the third embodiment.

If input data is such packet data that the amount of data contained in packets is constant and that requires high-speed packet data transmission processing in preference to an accurate packet data transmission rate, then the sending process selector sends the input data to the packet data sending apparatus according to the fourth embodiment.

Consequently, packets can be sent in a manner optimum for data to be sent therewith.

A packet data sending apparatus according to a seventh embodiment of the present invention will be described below.

According to the seventh embodiment, data at different data transmission rates are transmitted at successive times through the same transmission channel. Time intervals at which packet data transmission tasks are started are established to match the highest data transmission rate.

Figure 6:
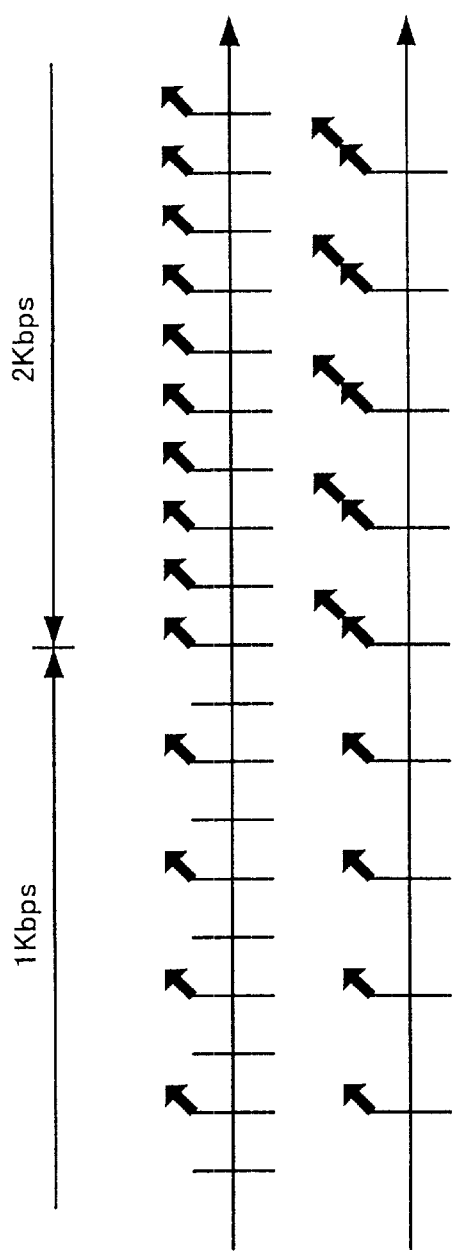
FIG. 6(A) is a diagram showing the relationship between time intervals at which packet data transmission tasks are started and a data transmission rate when the intervals are of 0.5 ms.
FIG. 6(B) is a diagram showing the relationship between time intervals at which packet data transmission tasks are started and a data transmission rate when the intervals are of 1 ms.

FIGS. 6(A) and 6(B) show the relationship between time intervals at which packet data transmission tasks are started and a data transmission rate. In FIG. 6(A), the time intervals at which packet data transmission tasks are started are of 0.5 ms, and in FIG. 6(B), the time intervals at which packet data transmission tasks are started are of 1 ms.

For transmitting data at a data transmission rate of 2 Kbps through a transmission channel in which data are being transmitted at a data transmission rate of 1 Kbps, if packets are sent in packet data transmission tasks that are started at time intervals of 1 ms as shown in FIG. 6(B), then the data at the data transmission rate of 2 Kbps need to be transmitted in two packets each time a packet data transmission task is started. However, transmitting a plurality of packets each time a packet data transmission task is started poses a large burden on the network.

To avoid such a drawback, packets are sent by starting packet data transmission tasks at time intervals of 0.5 ms as shown in FIG. 6(A). For transmitting the data at the data transmission rate of 2 Kbps, a packet is sent each time a packet data transmission task is started, and for transmitting the data transmission rate of 1 Kbps, a packet is sent each time every other packet data transmission task is started.

Stated otherwise, for transmitting data at different data transmission rates at successive times through the same transmission channel, time intervals at which packet data transmission tasks are started are established to match the highest data transmission rate, and one packet is sent each time a packet data transmission task is started.

In this fashion, while packet data are being transmitted, the data transmission rate can be changed, and the burden on the network can be reduced.

Since the data transmission rate can be changed in the same transmission channel, it is possible to insert commercial video data at a different data transmission rate within a movie program in television broadcasting.

According to the present invention, as described above, the sent data amount storage means stores the amount M of packet data of all packets sent after the preset time, and the calculating means adds amounts $m_0$–$m_{NMAX}$ of packet data of the packets (0, 1, 2, . . . , $N_{MAX}$) which may possibly be sent at the present packet sending timing, to the amount M of packet data stored in the sent data amount storage means thereby to obtain a plurality of total amounts (M+$m_0$)–(M+$m_{MAX}$) of packet data. The calculating means then calculates a plurality of data transmission rates $R_0$–$R_{NMAX}$ based on the total amounts (M+$m_0$)–(M+$m_{MAX}$) of packet data. The selecting means selects a data transmission rate closest to a desired data transmission rate R from the data transmission rates calculated by the calculating means.

The packet sending means then sends a number of packets commensurate with the data transmission rate selected by the selecting means. Therefore, packets can be sent at the data transmission rate closest to the desired data transmission rate R even if the present packet sending timing suffers a deviation.

Consequently, even non-ATM packet data sending apparatus can perform a service of transmitting video data of high image quality over a long period time without suffering a frame data loss.

Furthermore, the data transmission rate can continuously be changed simply by arbitrarily changing the desired data transmission rate R while keeping intact the time intervals to start packet data transmission tasks.

Ordinary data that occur as bursts, rather than video and audio data, can also be transmitted at a constant data transmission rate, but not as burst data. Therefore, when such ordinary data that occur as bursts are transmitted, the burden on the network is reduced, and any transmission loss of the data is also reduced.

When the packet size is constant, the sent data amount storage means stores a number of packets transmitted after a preset time, and the calculating means calculates a data transmission rate using the calculated number of packets. Therefore, the storage area needed can be reduced because the number of packets, rather than the total amount of packet data, is recorded therein.

Upper and lower data transmission rates are alternately used at respective packet sending timings to determine a number of packets to be sent at the present packet sending timing. This can simplify the calculation process for a higher processing speed though the accuracy of the data transmission rate is slightly lowered.

The time at which the amount of data stored in the sent data amount storage means has reached a predetermined level is established as a preset time, for thereby making the data transmission rate highly accurate.

The sending process selector allows packets to be sent in a manner optimum for the nature of input data.

Time intervals at which packet data transmission tasks are started are established to match the highest data transmission rate. While packet data are being transmitted, the data transmission rate can be changed, and the burden on the network can be reduced. Since the data transmission rate can be changed in the same transmission channel, it is possible to insert commercial video data at a different data transmission rate within a movie program in television broadcasting.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A packet data sending apparatus for sending a plurality of packets at each packet sending timing, comprising:

sent data amount storage means for storing an amount of packet data sent from a preset time to a preceding packet sending timing;

calculating means for adding a plurality of amounts of packet data which may possibly be sent at a present packet sending timing, to the amount of packet data stored in said sent data amount storage means thereby to obtain a plurality of total amounts of packet data, and dividing the total amounts of packet data by a time period from the preset time to the present packet sending timing thereby to calculate a plurality of data transmission rates;

selecting means for selecting a data transmission rate closest to a desired data transmission rate from the data transmission rates calculated by said calculating means; and packet sending means for sending a number of packets corresponding to the amount of packet data commensurate with the data transmission rate selected by said selecting means.

2. A packet data sending apparatus according to claim 1, wherein said sent data amount storage means comprises means for storing an excess amount of packet data if the amount of packet data to be stored therein exceeds a maximum amount of packet data which can be stored therein, further comprising:

preset time storage means for storing as said preset time a time when the amount of packet data stored in said sent data amount storage means reaches a predetermined level smaller than said maximum amount of packet data;

said calculating means comprising means for determining the sum of the difference between said maximum amount of packet data and said predetermined level and the amount of packet data stored in said sent data amount storage means, adding the amounts of packet data which may possibly be sent at the present packet sending timing, to said sum thereby to obtain a plurality of total amounts of packet data, and dividing the total amounts of packet data by a time period from said preset time stored in said preset time storage means to the present packet sending timing.

3. A packet data sending apparatus for sending a plurality of packets at each packet sending timing, comprising:

sent data amount storage means for storing an amount of packet data sent from a preset time to a preceding packet sending timing;

calculating means for adding a plurality of amounts of packet data which may possibly be sent at a present packet sending timing, to the amount of packet data stored in said sent data amount storage means thereby to obtain a plurality of total amounts of packet data, and dividing the total amounts of packet data by a time period from the preset time to the present packet sending timing thereby to calculate a plurality of data transmission rates;

selecting means for selecting a higher data transmission rate greater than and closest to a desired data transmission rate and a lower data transmission rate smaller than and closest to said desired data transmission rate, from the data transmission rates calculated by said calculating means; and packet sending means for sending a number of packets corresponding to the amount of packet data commensurate with one of the higher and lower data transmission rates selected by said selecting means, which is opposite to the one selected at said preceding packet sending timing.

4. A packet data sending apparatus according to claim 3, wherein said sent data amount storage means comprises means for storing an excess amount of packet data if the amount of packet data to be stored therein exceeds a maximum amount of packet data which can be stored therein, further comprising:

preset time storage means for storing as said preset time a time when the amount of packet data stored in said sent data amount storage means reaches a predetermined level smaller than said maximum amount of packet data;

said calculating means comprising means for determining the sum of the difference between said maximum amount of packet data and said predetermined level and the amount of packet data stored in said sent data amount storage means, adding the amounts of packet data which may possibly be sent at the present packet sending timing, to said sum thereby to obtain a plurality of total amounts of packet data, and dividing the total amounts of packet data by a time period from said preset time stored in said preset time storage means to the present packet sending timing.

5. A packet data sending apparatus for sending a plurality of packets each containing a constant amount of data at each packet sending timing, comprising:

sent packet number storage means for storing a number of packets sent from a preset time to a preceding packet sending timing;

calculating means for adding a plurality of numbers of packets which may possibly be sent at a present packet sending timing, to the number of packets stored in said sent packet number storage means thereby to obtain a plurality of total numbers of packets, multiplying the total numbers of packets by the amount of data contained in each packet to obtain a plurality of total amounts of packet data, and dividing the total amounts of packet data by a time period from the preset time to the present packet sending timing thereby to calculate a plurality of data transmission rates;

selecting means for selecting a data transmission rate closest to a desired data transmission rate from the data transmission rates calculated by said calculating means; and packet sending means for sending a number of packets commensurate with the data transmission rate selected by said selecting means.

6. A packet data sending apparatus according to claim 5, wherein said sent packet number storage means comprises means for storing an excess number of packets if the number of packets to be stored therein exceeds a maximum number of packets which can be stored therein, further comprising:

preset time storage means for storing as said preset time a time when the number of packets stored in said sent packet number storage means reaches a predetermined level smaller than said maximum number of packets;

said calculating means comprising means for determining the sum of the difference between said maximum number of packets and said predetermined level and the number of packets stored in said sent packet number storage means, adding the numbers of packets which may possibly be sent at the present packet sending timing, to said sum thereby to obtain a plurality of total numbers of packets, multiplying the total numbers of packets by the amount of data contained in each packet to obtain a plurality of total amounts of packet data, and dividing the total amounts of packet data by a time period from said preset time stored in said preset time storage means to the present packet sending timing.

7. A packet data sending apparatus for sending a plurality of packets each containing a constant amount of data at each packet sending timing, comprising:

sent packet number storage means for storing a number of packets sent from a preset time to a preceding packet sending timing;

calculating means for adding a plurality of numbers of packets which may possibly be sent at a present packet sending timing, to the number of packets stored in said sent packet number storage means thereby to obtain a plurality of total numbers of packets, multiplying the total numbers of packets by the amount of data contained in each packet to obtain a plurality of total amounts of packet data, and dividing the total amounts of packet data by a time period from the preset time to the present packet sending timing thereby to calculate a plurality of data transmission rates;

selecting means for selecting a higher data transmission rate greater than and closest to a desired data transmission rate and a lower data transmission rate smaller than and closest to said desired data transmission rate, from the data transmission rates calculated by said calculating means; and packet sending means for sending a number of packets commensurate with one of the higher and lower data transmission rates selected by said selecting means, which is opposite to the one selected at said preceding packet sending timing.

8. A packet data sending apparatus according to claim 7, wherein said sent packet number storage means comprises means for storing an excess number of packets if the number of packets to be stored therein exceeds a maximum number of packets which can be stored therein, further comprising:

preset time storage means for storing as said preset time a time when the number of packets stored in said sent packet number storage means reaches a predetermined level smaller than said maximum number of packets;

said calculating means comprising means for determining the sum of the difference between said maximum number of packets and said predetermined level and the number of packets stored in said sent packet number storage means, adding the numbers of packets which may possibly be sent at the present packet sending timing, to said sum thereby to obtain a plurality of total numbers of packets, multiplying the total numbers of packets by the amount of data contained in each packet to obtain a plurality of total amounts of packet data, and dividing the total amounts of packet data by a time period from said preset time stored in said preset time storage means to the present packet sending timing.

9. A packet data sending apparatus for sending a plurality of packets at each packet sending timing, comprising:

first calculating means for adding a plurality of amounts of packet data which may possibly be sent at a present packet sending timing, to an amount of packet data sent from a preset time to a preceding packet sending timing thereby to obtain a plurality of total amounts of packet data, and dividing the total amounts of packet data by a time period from the preset time to the present packet sending timing thereby to calculate a plurality of data transmission rates;

first selecting means for selecting a data transmission rate closest to a desired data transmission rate from the data transmission rates calculated by said first calculating means;

first packet sending means for sending a number of packets corresponding to the amount of packet data commensurate with the data transmission rate selected by said first selecting means;

second selecting means for selecting a higher data transmission rate greater than and closest to said desired data transmission rate and a lower data transmission rate smaller than and closest to said desired data transmission rate, from the data transmission rates calculated by said first calculating means;

second packet sending means for sending a number of packets corresponding to the amount of packet data commensurate with one of the higher and lower data transmission rates selected by said second selecting means, which is opposite to the one selected at said preceding packet sending timing;

second calculating means for adding a plurality of numbers of packets which may possibly be sent at the present packet sending timing, to a number of packets sent from the preset time to the preceding packet sending timing thereby to obtain a plurality of total numbers of packets, multiplying the total numbers of packets by the amount of data contained in each packet to obtain a plurality of total amounts of packet data, and dividing the total amounts of packet data by the time period from the preset time to the present packet sending timing thereby to calculate a plurality of data transmission rates;

third selecting means for selecting a data transmission rate closest to the desired data transmission rate from the data transmission rates calculated by said second calculating means;

third packet sending means for sending a number of packets commensurate with the data transmission rate selected by said third selecting means;

fourth selecting means for selecting a higher data transmission rate greater than and closest to said desired data transmission rate and a lower data transmission rate smaller than and closest to said desired data transmission rate, from the data transmission rates calculated by said second calculating means;

fourth packet sending means for sending a number of packets corresponding to the amount of packet data commensurate with one of the higher and lower data transmission rates selected by said fourth selecting means, which is opposite to the one selected at said preceding packet sending timing; and fifth selecting means for selecting one of said first and said second calculating means, one of said first through fourth selecting means, and one of said first through fourth packet sending means, depending on the nature of packet data to be transmitted.

10. A packet data sending apparatus according to claim 9, wherein said fifth selecting means comprises means for selecting said first calculating means, said first selecting means, and said first packet sending means if the packet data to be transmitted have different amounts of data for respective packets and need an accurate packet data transmission rate rather than high-speed packet data transmission processing.

11. A packet data sending apparatus according to claim 9, wherein said fifth selecting means comprises means for selecting said first calculating means, said second selecting means, and said second packet sending means if the packet data to be transmitted have different amounts of data for respective packets and need high-speed packet data transmission processing rather than an accurate packet data transmission rate.

12. A packet data sending apparatus according to claim 9, wherein said fifth selecting means comprises means for selecting said second calculating means, said third selecting means, and said third packet sending means if the packet data to be transmitted have equal amounts of data for respective packets and need an accurate packet data transmission rate rather than high-speed packet data transmission processing.

13. A packet data sending apparatus according to claim 9, wherein said fifth selecting means comprises means for selecting said second calculating means, said fourth selecting means, and said fourth packet sending means if the packet data to be transmitted have equal amounts of data for respective packets and need high-speed packet data transmission processing rather than an accurate packet data transmission rate.

* * * * *